(12) United States Patent
Loving et al.

(10) Patent No.: US 11,507,880 B2
(45) Date of Patent: Nov. 22, 2022

(54) AUTOMATIC AND CONTINUOUS MONITORING AND REMEDIATION OF API INTEGRATIONS

(71) Applicant: KYNDRYL, INC., New York, NY (US)

(72) Inventors: Linwood E. Loving, Mechanicsville, VA (US); Pietro Iannucci, Rome (IT); Mark David Batinich, North Aurora, IL (US); Luigi Pichetti, Rome (IT)

(73) Assignee: Kyndryl, Inc., New York, NY (US)

( * ) Notice: Subject to any disclaimer, the term of this patent is extended or adjusted under 35 U.S.C. 154(b) by 781 days.

(21) Appl. No.: 16/451,046

(22) Filed: Jun. 25, 2019

(65) Prior Publication Data

US 2020/0410386 A1 Dec. 31, 2020

(51) Int. Cl.
| | |
|---|---|
| *G06N 20/00* | (2019.01) |
| *G06F 9/54* | (2006.01) |
| *G06F 16/21* | (2019.01) |
| *G06K 9/62* | (2022.01) |

(52) U.S. Cl.
CPC ............. *G06N 20/00* (2019.01); *G06F 9/541* (2013.01); *G06F 16/211* (2019.01); *G06K 9/6218* (2013.01); *G06K 9/6267* (2013.01)

(58) Field of Classification Search
CPC .... G06K 9/6218; G06K 9/6267; G06N 20/00; G06F 9/541; G06F 16/211
See application file for complete search history.

(56) References Cited

U.S. PATENT DOCUMENTS

| | | | |
|---|---|---|---|
| 9,811,394 B1 | 11/2017 | Kogias | |
| 2005/0223268 A1* | 10/2005 | Tchen | ........... G11C 16/102 714/6.12 |
| 2008/0112421 A1* | 5/2008 | Krtolica | ........... H04L 63/0236 714/E11.207 |
| 2015/0128103 A1 | 5/2015 | Stratton | |
| 2016/0092344 A1 | 3/2016 | Bally | |
| 2017/0149641 A1 | 5/2017 | Hosie | |
| 2018/0089005 A1* | 3/2018 | Green | ............. G06F 9/541 |
| 2018/0157830 A1 | 6/2018 | Siebert | |
| 2018/0196647 A1 | 7/2018 | Batinich | |
| 2019/0102157 A1* | 4/2019 | Caldato | ............... G06F 8/60 |
| 2019/0188288 A1* | 6/2019 | Holm | ............. G06F 16/211 |

OTHER PUBLICATIONS

Nguyen et al., "API Code Recommendation Using Statistical Learning from Fine-Grained Changes", In Proceedings of the International Symposium on the Foundations of Software Engineering (FSE'16), 12 pages.

* cited by examiner

*Primary Examiner* — Etienne P Leroux
(74) *Attorney, Agent, or Firm* — Tutunjian & Bitetto, P.C.; John Kennel (57) ABSTRACT

Monitoring and automatically remediating issues that arise at run-time during integrations between Application Program Interfaces (APIs) of two or more endpoint products over an integration framework. The monitoring is facilitated by inserting specialized modules into the integration framework that detects changes in the outputs of the integrated endpoint products and attempts to remedy them by automatically adjusting the output in-transit towards a destination endpoint. The specialized modules can be enhanced by machine learning algorithms trained on previously successful remedies. Remedies may be directed towards schema variations and performance drifts, among others.

17 Claims, 6 Drawing Sheets

AUTOMATIC AND CONTINUOUS MONITORING AND REMEDIATION OF API INTEGRATIONS

BACKGROUND

The present invention relates generally to the field of application programming interface (API) integrations, and more particularly to remediating issues resulting from changes to APIs that have been integrated into frameworks between two or more endpoints.

In the field of computer programming, an application programming interface (API) is a set of subroutine definitions, tools, and communication protocols for creating software. In general terms, API are a set of clearly defined methods of communication between a variety of software components. A well-defined API facilitates easier development of computer programs by providing some building blocks which are then integrated together by a programmer. An API may be created for an operating system, database system, computer hardware, web-based system, or a software library. API specifications may take many forms, but typically include specifications for routines, data structures, object classes, variables, or remote calls. Portable operating system interface (POSIX), Windows API and advanced small computer system interface programming interface (ASPI) are examples of different forms of APIs.

It is known to integrate APIs into frameworks. These steps for integrating an API into a framework are as follows: (i) identify API methods and data requirements for both inbounds and outbounds directions from each endpoint; (ii) identify network connectivity requirements; (iii) identify security requirements; (iv) select integration method from either automated or manual methods; and (v) run integration via the selected method(s) and map the data between each endpoint.

An Xlet resembles a Java applet and was originally introduced in Sun Microsystems's Java TV specification to support applications for Digital TV. While Xlet appears superficially different from other application models in Java (for example, applet and MIDlet), it is actually intended to be a generalization of such models. The X in Xlet represents an unknown such that that the Xlet framework may be used in any context rather than specific to Digital TV.

Machine learning (ML) is the study of algorithms and statistical models that computer systems use to effectively perform a specific task without relying on explicit instructions from a human programmer, using patterns and inference instead. It is viewed as a subset of artificial intelligence (AI). Machine learning algorithms create a mathematical model based on sample data (alternatively known as training data) in order to determine predictions or decisions without being explicitly programmed to perform the task. Machine learning algorithms are typically applied to a wide variety of practical applications such as email filtering and computer vision, situations where it is considered infeasible to develop an algorithm of specific instructions for performing the task.

SUMMARY

According to an aspect of the present invention, there is a method, computer program product and/or system that performs the following operations (not necessarily in the following order): (i) receiving an integration framework including a plurality of endpoint products and an adapter module, where the plurality of endpoint products includes at least a first endpoint product, each endpoint product includes a set of application programming interfaces (APIs), and the adapter module includes machine language for facilitating compatibility between at least some of the plurality of endpoint products; (ii) monitoring output from the plurality of endpoint products during runtime; (iii) detecting at least one change to the at least one API of the set of APIs of the first endpoint product based, at least in part, on the monitored output; (iv) collecting data from the plurality of endpoints and their corresponding sets of APIs based, at least in part, on the detected at least one change; and (v) determining, by machine logic, a set of modifications to the machine language of the adapter module based, at least in part, on the collected data.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
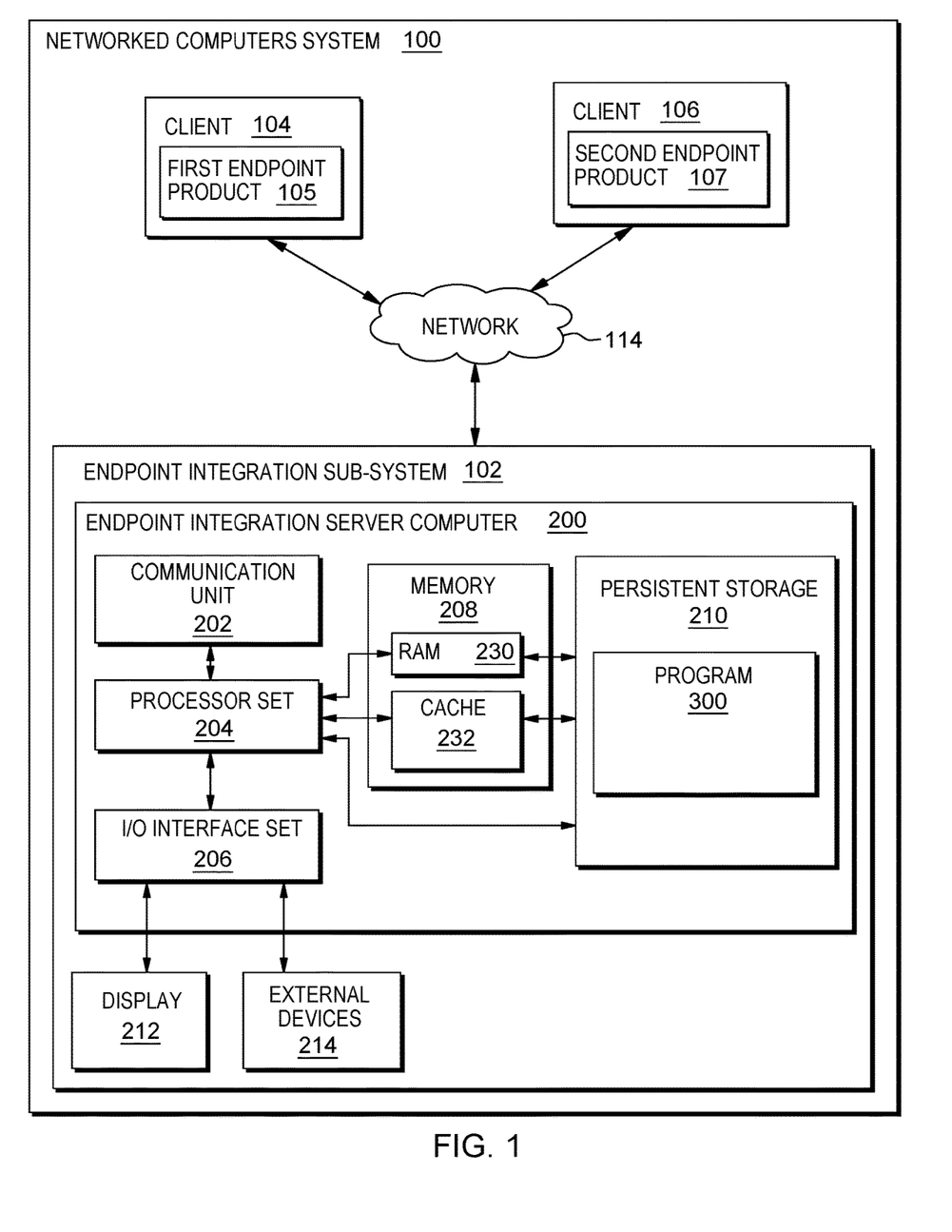
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: integration sub-system 102; client sub-systems 104 and 106; first endpoint product 105; second endpoint product 107; communication network 114; integration server computer 200; communication unit 202; processor set 204; input/output (I/O) interface set 206; memory device 208; persistent storage device 210; display device 212; external device set 214; random access memory (RAM) devices 230; cache memory device 232; and program 300.

Integration sub-system 102 is, in many respects, representative of the various computer sub-system(s) in the present invention. Accordingly, several portions of integration sub-system 102 will now be discussed in the following paragraphs.

Integration sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Integration sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Integration sub-system 102 is shown as a block diagram with many double arrows. These double arrows (no separate reference numerals) represent a communications fabric, which provides communications between various components of integration sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for integration sub-system 102; and/or (ii) devices external to integration sub-system 102 may be able to provide memory for integration sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to integration sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with integration server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
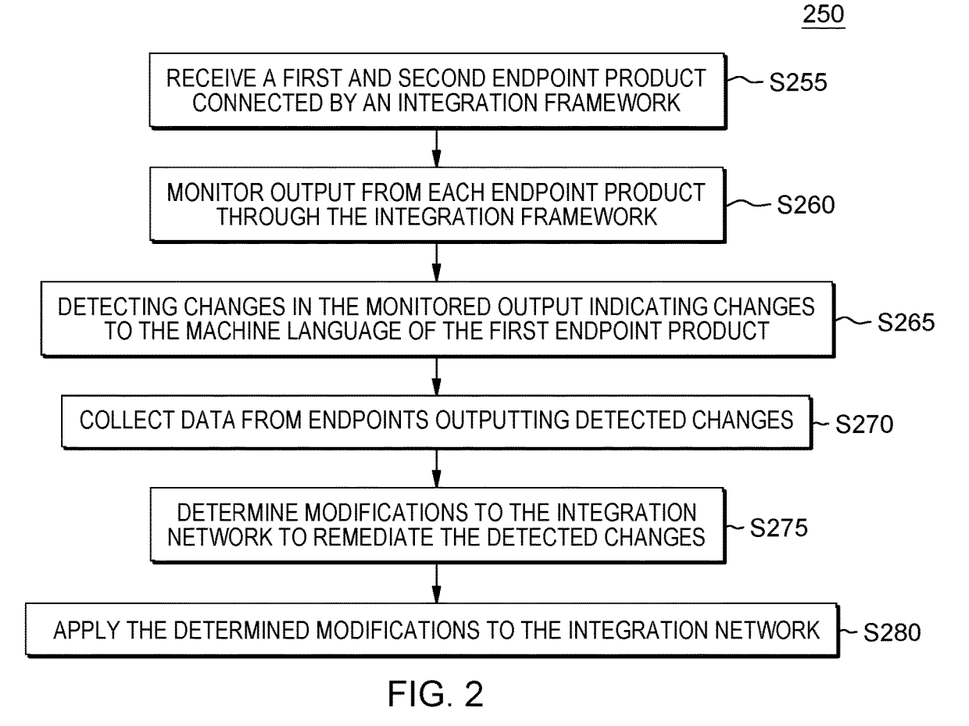
FIG. 2 is a flowchart showing a first embodiment method performed, at least in part, by the first embodiment system.
Figure 3:
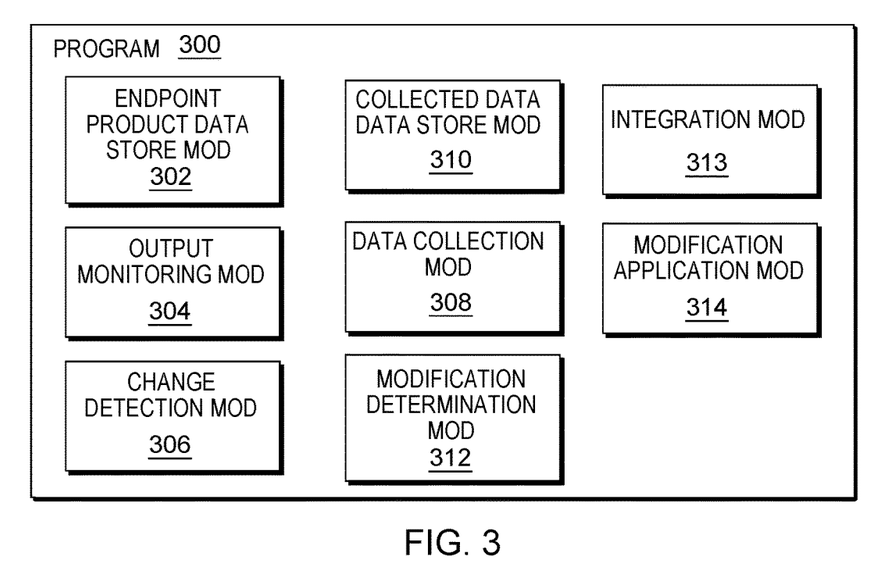
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where endpoint data store module ("mod") 302 receives a first and second endpoint product connected by an integration framework. In this simplified embodiment, the first endpoint product is first endpoint product 105 of client 104 of FIG. 1. The second endpoint product is second endpoint product 107 of client 106. Clients 104 and 106 are connected to endpoint integration system 102 through network 114. Outgoing API calls from the first and second endpoint products 105 and 107 and incoming output data resulting from the outgoing API calls are received and stored in endpoint data store mod 302. In this simplified embodiment, first endpoint product 105 is a software application for aggregating weather forecast data from multiple sources for a given geographical location. Also, in this simplified embodiment the second endpoint product 107 is a software application for recommending local activities based upon user preferences and local forecasts for a given geographical location, time and date. First endpoint product 105 includes a set of application program interfaces (APIs) for other software programs to request the weather forecast data as output. Second endpoint product 107 includes a set of APIs for other software applications to provide weather forecast data as input. In this simplified embodiment, the set of APIs for first endpoint product 105 include outputting an aggregated forecast data set including up to three forecasts, each from a different source for the same geographical area. Each forecast includes a pair of geographical coordinates, a time, a date, and three weather parameters and their respective values. The three weather parameters are: (i) temperature; (ii) precipitation chance; and (iii) wind speed. Also, in this simplified embodiment the second endpoint product 107 includes a set of APIs to request and receive weather forecast information from another program, endpoint product 105 in this example. The set of APIs for the second endpoint product 107 includes providing means for inputting a user data set including two parameters: (i) a pair of geographic coordinates; and (ii) a date and time. Additionally, in this simplified embodiment, an integration framework, such as program 300, acts as an intermediary between first endpoint product 105 and second endpoint product 107, receiving and passing on their API calls and returned output/input data. In this simplified example embodiment, at an initial time, t0, the first endpoint product has the following API command:
exampleWeatherapp.requestForecastData(int n, float latitude, float longitude, timeDate theTimeDate)

This example API command is named 'exampleWeatherapp.requestForecastData' and has four parameters: (i) a single integer named 'n' indicating how many weather forecasts should be provided; (ii) a first floating point number named 'latitude' indicating a latitude component of a pair of geographic coordinates; (iii) a second floating point number named 'longitude' indicating a latitude component of a pair of geographic coordinates; and (iv) an instance of a data construct called 'timeDate' named theTimeDate defined to include a time of day (in 24 hour format) and a date (in Gregorian calendar format using a first integer to represent what day of the year it is and a second integer to represent what year it is). Another API in this simplified example embodiment, the API for the second endpoint product 107, at the initial time t0 includes the following API command:
localActivityapp.userInput(float latitude, float longitude, timeDate theTimeDate)

At t0, no API calls are exchanged. Alternatively, other types of software applications and their APIs may be used by embodiments of the present invention.

Processing proceeds to operation S260, where output monitoring mod 304 monitors the output from each endpoint product through the integration framework. In this simplified embodiment, mod 304 monitors the output that is being returned from first and second endpoint products 105 and 107 during runtime of the first and second endpoint products 105 and 107 while they are deployed to perform their intended solutions. In this example embodiment, each time either endpoint product invokes an API of the other endpoint product to receive output, mod 304 monitors the outgoing API call for changes to the API request (for example, changes to the names of parameters, changes to the number of parameters, changes to data types of the parameters, changes to the name of the API request, etc.). Also, in this example embodiment each time either endpoint product invokes an API of the other endpoint product to receive output, mod 304 monitors the output for changes to the data being output in response to the API call (for example, changes to the names of the variables being returned, changes to the number of variables, changes to the data types of the variables returned, etc.). In this simplified embodiment, mod 304 will monitor the interactions of the first and second endpoint products 105 and 107 from t0 through t2, with alternative embodiments referring to t3. At t1, the following API command is called by the second endpoint product 107:
exampleWeatherapp.requestForecastData(2, 100.50, 200.60, userTimeDate[9, 132, 2019])

The above example API command requestForecastData of the first endpoint product 105, named exampleWeatherapp includes: (i) an integer for two forecasts; (ii) a first latitude coordinate floating point number 100.50 of a geographical coordinate pair; (iii) a second longitudinal coordinate floating point number 200.60 of a geographical coordinate pair; and (iv) an instance of the data construct timeDate named userTimeDate including: (a) an integer indicating the ninth hour of a twenty-four hour schedule, (b) an integer indicating the $132^{nd}$ day of the year, and (c) the year 2019 AD of the Gregorian calendar. This API command call is received by mod 304 and recorded in the endpoint product data store mod 302 before continuing to endpoint product 105 of client 104. Also, at t1 first endpoint product 105 receives the above example API command and successfully processes the API request and returns the following:
forecast1[100.50, 200.60, 9, 132, 2019, 80.0, 0.10, 7]
forecast2[100.50, 200.60, 9, 132, 2019, 82.0, 0.20, 11]

The first forecast output data, forecast1, includes: (i) the same coordinates that were provided in the exampleWeatherapp.requestForecastData command (100.50, 200.60); (ii) the same time and date that were provided (9, 132, 2019); (iii) a temperature, eighty degrees Fahrenheit; (iv) a precipitation chance of ten percent; and (v) a wind speed of seven miles per hour. The second forecast output data, forecast2, includes: (i) the same coordinates that were provided (100.50, 200.60); (ii) the same time and date that were provided (9, 132, 2019); (iii) a temperature, eighty-two degrees Fahrenheit; (iv) a precipitation chance of twenty percent; and (v) a wind speed of eleven miles per hour. This output data is received by mod 304 and recorded in the endpoint data store mod 302 before continuing to endpoint product 107 of client 106. In alternative embodiments, the integration framework monitors for performance drift, also defined as deviations or degradation to the performance of the integration network as it performs integration operations between two or more endpoint products.

Processing proceeds to operation S265, where change detection mod 306 detects changes in the monitored output indicating changes to the machine language of the first endpoint product. In this simplified embodiment, a change is detected at t2. Second endpoint product 107 invokes the following API command from the first endpoint product 105, which passes through monitoring mod 304 and change detection mod 306:
exampleWeatherapp.requestForecastData(3, 100.50, 200.60, userTimeDate[9, 162, 2019])

However, between t1 and t2, the following change was made to the machine language of first endpoint product 105 that defines the parameters of the requestForecastData API command:
exampleWeatherapp.requestForecastData(int n, int latitude, int longitude, timeDate theTimeDate)

The parameters 'float latitude' and 'float longitude' have had their type changed from floating point numbers to integers. If the exampleWeatherapp.requestForecastData includes the wrong data types as parameter values when called, the first endpoint product 105 will not be able to execute the API command and return the expected output. Instead, the first endpoint product 105 sends an error message indicating that the second and third parameters are incompatible data types. This change was instituted by a development team for first endpoint product 105. When this error message is received, change detection mod compares the previously logged successful API command invocation and determines that the parameters provided in the present invocation at t2 match the data types used previously, detecting that a change must have occurred to the first endpoint product 105. In alternative embodiments, different kinds of changes might be detected, including but not limited to: (i) changes to the order of the parameters; (ii) changes to the names of parameters; and (iii) changes to the name of the API command, etc.

Processing proceeds to operation S270, where data collection mod 308 collects data from the endpoints outputting the detected changes. In this simplified embodiment, mod 308 begins collecting data from the first endpoint product 105 and the second endpoint product 107 by collecting the data about previous invocations of the 'exampleWeatherapp.requestForecastData' API command by the second endpoint product 107 from the endpoint product data store mod 302 and stores this collected data in collected data data store mod 310. In this simplified example embodiment, mod 308 collects the most recent successful API command invocation before the detected change, the API command invocation that lead to a detected change, and the error message returned from first endpoint product 105. The most recent successful API command invocation included the following information: (i) an integer for two forecasts; (ii) a first latitude coordinate floating point number 100.50 of a geographical coordinate pair; (iii) a second longitudinal coordinate floating point number 200.60 of a geographical coordinate pair; and (iv) and instance of the data construct timeDate named userTimeDate including: (a) an integer indicating the ninth hour of a twenty-four hour schedule, (b) an integer indicating the $132^{nd}$ day of the year, and (c) the year 2019 AD of the Gregorian calendar. The API command invocation that lead to the detected change includes: (i) an integer for three forecasts; (ii) a first latitude coordinate floating point number 100.50 of a geographical coordinate pair; and (iii) a second longitudinal coordinate floating point number 200.60 of a geographical coordinate pair; and an instance of the data construct timeDate named userTimeDate including: (a) an integer indicating the ninth hour of a twenty-four hour schedule, (b) an integer indicating the $162^{nd}$ day of the year, and (c) the year 2019 AD of the Gregorian calendar. The error message returned from first endpoint product 105 includes information indicating that the second and third parameters are incompatible data types. In alternative embodiments, other types of data might be collected including but not limited to: (i) machine language from one or more of the relevant endpoint products; (ii) information about specific error patterns for each specific endpoint; (iii) information about specific error classes for each specific endpoint; (iv) information about historical or expected performance metrics; (v) internal and/or external knowledge bases; (vi) historical remediation actions for the specific endpoint product; and (vii) historical remediation actions for similar errors.

Processing proceeds to operation S275, where modification determination mod 312 determines modifications to the integration network to remediate the detected changes. In this simplified embodiment, mod 312 determines what change to integration mod 313 would be required to facilitate continued operation of the integration between first endpoint product 105 and second endpoint product 107. In this example embodiment, working off of the collected data in mod 310, mod 312 determines that, based on the error that was received and the similarity between the invocation at t1 and t2, the request at t2 should use a different data type for the second and third parameters. To determine which data type should be used instead, mod 312 considers using similar data types to 'float'. In this simplified example, integer is the most similar data type, as both are used for representing numerical values. 'Float' is used to represent numbers that include decimal values, such as one-and-a-half. 'Integers' represent whole, complete numbers such as one, two, three, etc. Therefore, the change that is determined is to adjust the data type of the second and third parameters of the invocation used by the second endpoint product 107 at t2. In this simplified embodiment, the change would result in the following API command invocation:
exampleWeatherapp.requestForecastData(3, 100, 200, userTimeDate[9, 162, 2019])

This change results in the information of the decimal places for the second and third parameters to be lost, which were formerly 100.50 and 200.60, respectively. In alternative embodiments, modification determination mod includes a machine learning component that is trained using one or more sets of training data, with the training data including structured data correlating errors during integration network operations and remedies to overcome the errors to train a pattern for recognizing errors and their matching remedies. This machine learning component is then applied to the unstructured data passing through the integration network. If a remedy is successful, it is added as a positive training sample for pattern analyzing and remedy identification. If a remedy is unsuccessful, it is included as a negative training sample for distinguishing against the positive training samples. In further alternatives, unsuccessful remedies are excluded from the training sample.

Processing proceeds to operation S280, where modification application mod 314 applies the determined modifications to the integration network. In this simplified example embodiment, a rule is added to integration mod 313 to invoke the changed API command and test if output similar to the output present at t1 is outputted by first endpoint product 105, and if the success of the determined change is apparent, apply a rule to monitor if the exampleWeatherapp.requestForecastData API command is invoked by any endpoint product connected to endpoint integration sub-system 102 where the second or third parameters are not integers and, if one or both are, change the non-integer parameters to be integers. In this simplified embodiment, the changed API command invocation results in the first endpoint product 105 outputting the following data to endpoint integration sub-system 102:
forecast1[100, 200, 9, 162, 2019, 78.0, 0.50, 12]
forecast2[100, 200, 9, 162, 2019, 76.0, 0.40, 9]
forecast3[100, 200, 9, 162, 2019, 75.0, 0.45, 13]

Because this output does not include an error message and this forecast data is in-line with previous outputs from the exampleWeatherapp.requestForecastData API command, in that a set of multiple forecasts was expected (also that three forecasts were specifically requested based on the first parameter used in the API command invocation), and is considered a success. Because this change is considered successful, integration mod 313 is modified to instruct output monitoring mod 304 for invocations of the exampleWeatherapp.requestForecastData API command by any endpoint product connected to endpoint integration sub-system 102 other than the first endpoint product 105 that include a second and/or third parameter that is a non-integer value and initiate integration mod 313 changing the data types of the value of the second and/or third parameter from a non-integer value to an integer value approximation. In an alternative embodiment, this successful modification is added as training data used in updating a machine learning algorithm used for detecting changes in output between endpoint products and determining an appropriate remedy to issues arising out of the detected change.

In alternative embodiments, if the applied remedy does not produce successful results (for example, the first endpoint product 105 throws the same error message, or a different error message) program 300 returns to S275 to contemplate another remedy, excluding the applied remedy from the possible outcomes and adds the applied remedy and its result to the collected data data store mod 310. In further alternative embodiments, if the applied remedy does not produce successful results, program 300 issues a notification to client 106 that first application 105 has changed the data type for the second and third parameters of the invoked API of the first endpoint product 105. In yet another alternative embodiment, program 300 issues a notification to client 104 that compatibility with second endpoint product 107 has been compromised by changing the data type for the second and third parameters of the invoked API of the first endpoint product 105. In either of these further alternative embodiments, the notification by program 300 may include transmitting the notification over a computer network and displaying on a graphical user interface of the respective clients. In even further alternative embodiments, specialized modules are implemented for each of the following actions corresponding to a specialty of the module: (i) monitoring for changes in output between endpoint products; (ii) analyzing patterns in the monitored changes; (iii) analyzing performance variation in the monitored changes; (iv) remediating errors corresponding to specific classes of errors, with sub-modules specialized towards each different class of errors; and (v) remediating performance degradation detected in the monitored changes. Each of these modules and sub-modules have corresponding machine learning algorithms specialized to their respective domains. This yields improvements to computers as a tool for machine learning relative to API integrations by narrowly tailoring the available training data for each specialized machine learning algorithm, improving accuracy in output and reducing redundant non-essential data included as input.

III. Further Comments and/or Embodiments

Some embodiments of the present invention recognize the following facts, potential problems and/or potential areas for improvement with respect to the current state of the art: (i) the use of application programming interfaces (APIs) for integrating systems keeps growing at a very rapid pace; (ii) the ability to rapidly enable developers/system integrators to connect to various API sources is a key differentiator among competing products and services; (iii) in this respect the XLETs approach is enabling developers to quickly build API integrations; (iv) this lowers the knowledge/skill gap and the time needed to explore new API sources/providers, which reduces the effort and costs needed to develop integrations; (v) the XLET approach did not however address what happens when the following undergo changes: (a) underlying API's, (b) parameters used to configure API's, and/or (c) the data required/provided with an API call; (vi) this typically requires either a refactor of the existing integration or creating an entire new integration project; (vii) these changes occurring over time to the original APIs used in an API integration project may break their backward compatibility, resulting into suddenly broken integrations or malfunctioning solutions where the root cause may not be easy to detect; and (viii) in such situations, once the integration problem/limitation is unveiled, the existing integration adapter must be analyzed by a skilled person and either be refactored or rebuilt.

Some embodiments of the present invention may include one, or more, of the following features, characteristics and/or advantages: (i) systematically monitoring, detecting and learning about changes which occurs over time in the data exchanged through APIs used for an integration project; (ii) one goal of some embodiments is to anticipate and eventually self-remediate problems to the implemented API integration solution; (iii) learning is achieved through a machine learning cognitive pattern of consuming structured data exchanged through an integration API; (iv) detection is achieved through a continuous monitoring of the data, status messages, and warnings exchanged with (provided to and returned from) a given vendor API used for an integration project; (v) API based integration projects are typically implemented by means of API integration frameworks that allow: (a) defining the integration and data transformation logic across the different endpoints, and (b) invoking the corresponding APIs to exchange the data; (vi) an example of such integration frameworks is the Xlet-framework; (vii) some embodiments of the present invention are described in the context of the Xlet-framework, but can be extended and applied as well also to other integration frameworks; (viii) a very high level Xlets-Integration framework that implements an integration by coordinating the execution of different the Xlets that exchange the data with the APIs of the different endpoints with the Xlets that implement the data transformation or business logic; (ix) insert into the integration framework some specialized components (for example, some new Xlets) that monitor the raw data coming and going through the endpoint APIs (but also trough the different Xlets); and (x) some of these Xlets are tasked with: (a) capture warning or error return codes in the APIs (e.g. 401—unauthorized, 404—not-found, 5xx—server-error, etc.), (b) understand about sub-optimal evolution of API answers overtime, which are leading to changes in resource usage by the integration code, (c) detect recurring API exceptions about malformed requests, (d) fatal persistent API exceptions (e.g. about syntax errors or payload structure which is not valid anymore can be a symptom of broken backward compatibility), and (e) detect response time degradation, etc.

Some embodiments of the present invention may include one, or more, of the following features, characteristics and/or advantages: (i) in an example Xlets integration framework, monitoring components can be specialized Xlets (for example, monitoring Xlets); (ii) the monitoring Xlets (because of a common interface shared among Xlets) can be chained in the integration workflow to intercept and inspect the raw data flowing to/from the different endpoint APIs; (iii) the monitoring Xlets monitors the raw data and can determine insights from this data by leveraging external or internal knowledge bases; (iv) or by dynamically consulting cognitive cloud services; (v) the monitoring Xlets can also include a classifier that uses machine learning and/or deep learning algorithms to: (a) first cluster the monitored data and recognize specific error patterns, and (b) second to classify the error patterns to specific classes of errors with specific remediation actions; (vi) in this way the monitoring Xlet can be trained to recognize specific error patterns or error classes for each specific endpoint; and (vii) this is also made easier by the fact that typical modern APIs are standardizing and embracing the Restful model that defines a common way to represent errors.

Figure 4:
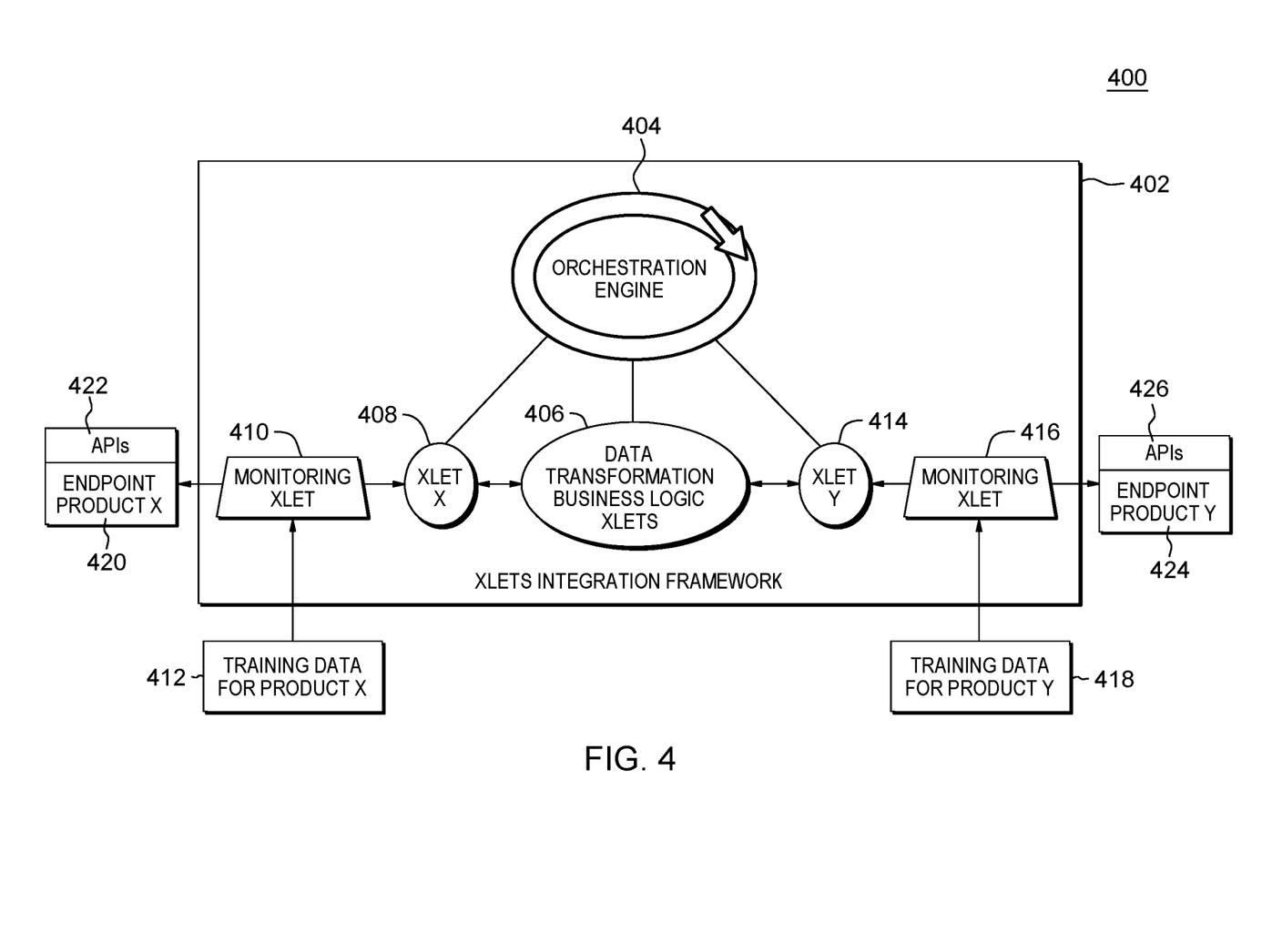
FIG. 4 is a block diagram of a second embodiment of a system according to the present invention.

An example embodiment will now be discussed with reference to FIG. 4. FIG. 4 is a functional block diagram illustrating various portions of Xlets integration system 400, including: (i) Xlets integration framework 402 (ii) orchestration engine 404; (iii) data transformation business logic Xlets 406; (iv) Xlet X 408; (v) monitoring Xlet 410; (vi) training data for product X 412; (vii) Xlet Y 414; (viii) monitoring Xlet 416; (ix) training data for product Y 418; (x) endpoint product X 420; (xi) APIs 422 for endpoint product X 420; (xii) endpoint product Y 424; and (xiii) APIs 426 for endpoint product Y 424.

In Xlets integration system 400, monitoring Xlets 410 and 416 are specialized monitoring Xlets that are inserted into a typical Xlets integration framework to monitor raw data being exchanged between endpoint product X 420 (and its respective APIs 422), endpoint product Y 424 (and its respective APIs 426) and their respective Xlets 408 and 414. From the raw data, the monitoring can determine insights from this data by leveraging external or internal knowledge bases or by dynamically consulting cognitive cloud services (not shown). The monitoring Xlets can also include a classifier that uses machine learning and/or deep learning algorithms to cluster the monitored data and recognize specific error patterns and classify the error patterns to specific classes of errors with specific remediation actions. In this way the monitoring Xlets can respectively be trained to recognize specific error patterns or error classes for each respective endpoint product.

Figure 5:
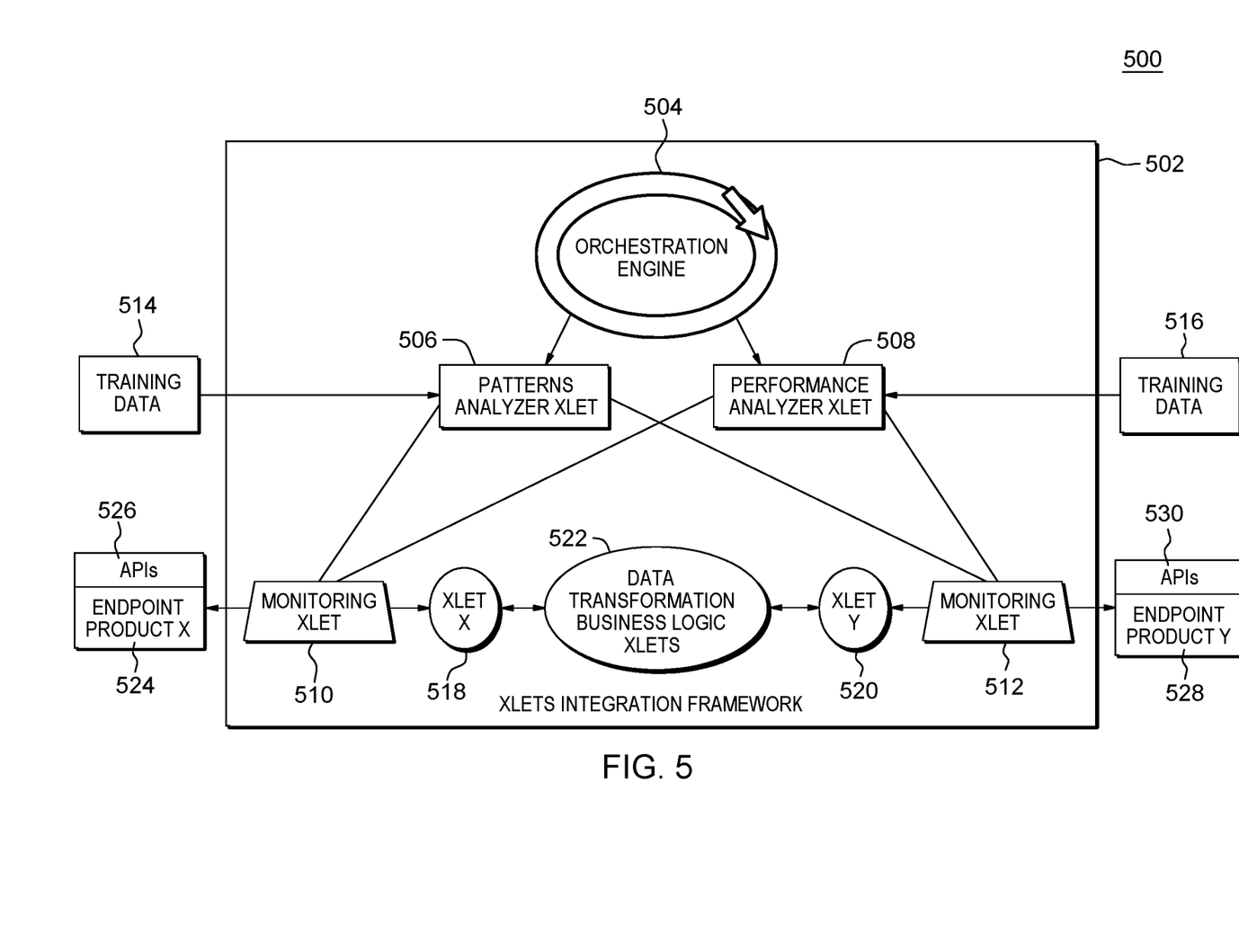
FIG. 5 is a block diagram of a third embodiment of a system according to the present invention.

An example embodiment will now be discussed with reference to FIG. 5. FIG. 5 is a functional block diagram illustrating various portions of Xlets integration system 500, including: (i) Xlets integration framework 502; (ii) orchestration engine 504; (iii) patterns analyzer Xlet 506; (iv) performance analyzer Xlet 508; (v) monitoring Xlet 510; (vi) monitoring Xlet 512; (vii) training data 514; (viii) training data 516; (ix) Xlet X 518; (x) Xlet Y 520; (xi) data transformation business logic Xlet 522; (xii) endpoint product X 524; (xiii) APIs 526 for endpoint product X 524; (xiv) endpoint product Y 528; and (xv) APIs 530 for endpoint product Y 528.

Xlets integration system 500 builds upon Xlets integration system 400 of FIG. 4 by branching out specific functionality from the monitoring Xlets relating to performance and pattern analyzation, leading to Xlets specialized for each, respectively (patterns analyzer Xlet 506 of FIG. 5 and performance analyzer Xlet 508). In this embodiment, monitoring Xlets 510 and 512 capture the raw data and dispatch this data to pattern analyzer Xlet 506 and performance analyzer Xlet 508 for further analysis. Also in this embodiment, the specialized modules (506 and 508) get specific training on the specific aspect they need to manage (using training data 514 and 516, respectively), which contributes to increasing the accuracy of the entire system for monitoring and remediating integration issues.

Figure 6:
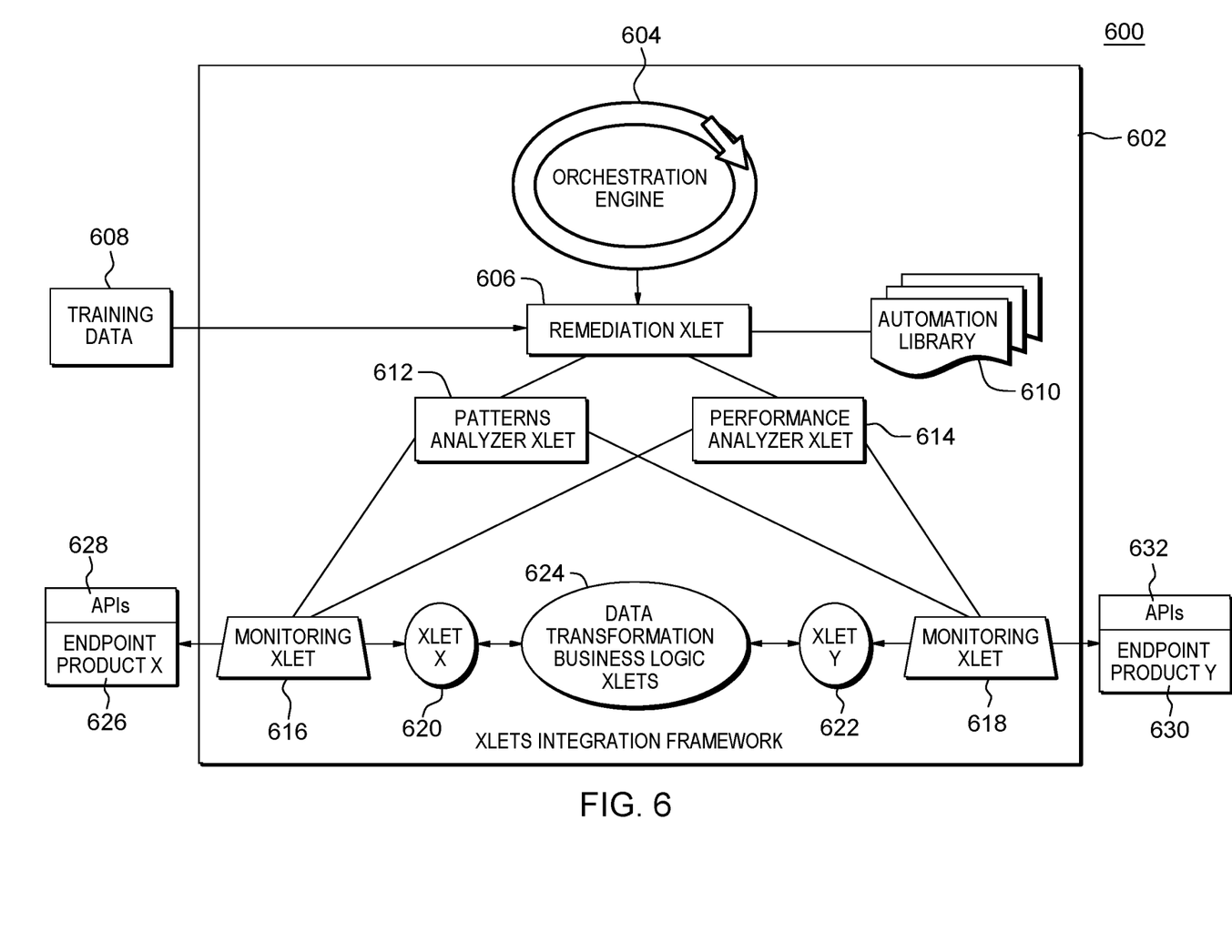
FIG. 6 is a block diagram of a fourth embodiment of a system according to the present invention.

An example embodiment will now be discussed with reference to FIG. 6. FIG. 6 is a functional block diagram illustrating various portions of Xlets integration system 600, including: (i) Xlets integration framework 602; (ii) orchestration engine 604; (iii) remediation Xlet 606; (iv) training data 608; (v) automation library 610; (vi) patterns analyzer Xlet 612; (vii) performance analyzer Xlet 614; (viii) monitoring Xlet 616; (ix) monitoring Xlet 618; (x) Xlet X 620; (xi) Xlet Y 622; (xii) data transformation business logic Xlets 624; (xiii) endpoint product X 626; (xiv) APIs 628 for endpoint product X 626; (xv) endpoint product Y 630; and (xvi) APIs 632 for endpoint product Y 630.

Xlet integration system 600 expands upon the Xlet integration system 500 of FIG. 5 by inserting a specialized error remediation Xlet 606, which receives error information from the monitoring Xlets 616 and 618. Remediation Xlet 606 can be either a simple automation component that given a specific error type invokes a set of predefined actions in an automation library (such as automation library 610), or it can leverage the suggestions from another external service (not shown). Alternatively, remediation Xlet 606 can use machine-learning or deep-learning algorithms are trained on how to automate the remediation of specific classes of errors or can learn by itself by the percentage of success of the automations that it runs against specific classes of errors. Remediation Xlet 606 can execute commands from a predefined task library or can also interact directly with orchestration engine 604 (for example to replace the existing Xlet X 620 with a new version of the same Xlet as a result of a new version of product X 626 and some of its APIs 628 having been installed by a customer).

Figure 7:
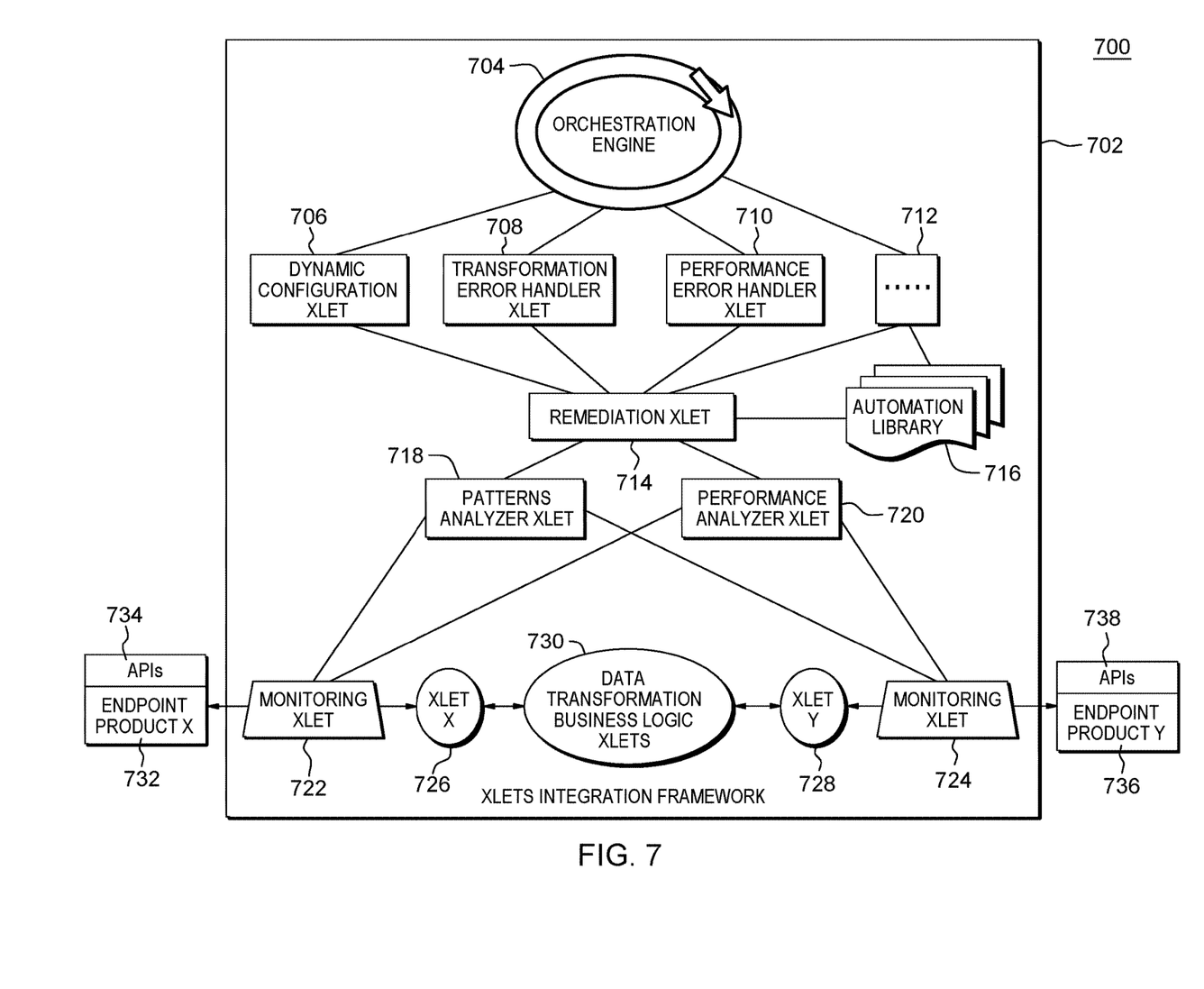
FIG. 7 is a block diagram of a fifth embodiment of a system according to the present invention.

An example embodiment will now be discussed with reference to FIG. 7. FIG. 7 is a functional block diagram illustrating various portions of Xlets integration system 700, including: (i) Xlets integration framework 702; (ii) orchestration engine 704; (iii) dynamic configuration Xlet 706; (iv) transformation error handler Xlet 708; (v) performance error handler Xlet 710; (vi) Xlet 712, which may be another specialized Xlet such as a management Xlet; (vii) remediation Xlet 714; (viii) automation library 716; (ix) patterns analyzer Xlet 718; (x) performance analyzer Xlet 720; (xi) monitoring Xlet 722; (xii) monitoring Xlet 724; (xiii) Xlet X 726; (xiv) Xlet Y 728; (xv) data transformation business logic Xlets 730; (xvi) endpoint product X 732; (xvii) APIs 734 for endpoint product X; (xviii) endpoint product Y 736; and (xix) APIs 738 for endpoint product Y 736.

Xlet integration system 700 expands upon the Xlet integration system 600 of FIG. 6, as functionality belonging to remediation Xlet 606 can be split into a number of more specialized modules (such as dynamic configuration Xlet 706 of FIG. 7, transformation error handler Xlet 708, and performance error handler Xlet 710) that analyze specific classes of errors and find optimal automations/solutions for their respective specific classes of errors. In this example embodiment, remediation Xlet 714 can perform a first initial triage of the problem and then dispatch it to a specialized Xlet (such as 706, 708 or 710) that can analyze the error and find the optimal automation for the specific error. When deployed in a cognitive system, this allows Xlet integration system 700 to simplify the problem domain into a number of smaller subdomains that are simpler to train and that provides improved accuracy.

Some embodiments of the present invention may include one, or more, of the following features, characteristics and/or advantages: (i) apply cognitive technologies to monitoring and automation and also to specialize and apply them in the context of API-based integrations and integration frameworks; (ii) inserting cognitive monitoring modules between an endpoint product and an integration framework facilitates gathering significant insight on how the integration is behaving and performing; (iii) this insight can be used to infer the best methods to automatically remediate a problem in the integration; (iv) the knowledge about error classes and remediation actions can be continuously improved through new training or learning on the job techniques where the system learns based on the effectiveness of the error-remediation actions that it has executed; (v) a system and method for systematically monitoring, detecting and learning about changes which occurs over time in the data exchanged through APIs used for an integration project; (vi) one goal is to anticipate and eventually self-remediate problems to implemented API integration solutions; (vii) learning is achieved through a machine-learning cognitive pattern of consuming structured data exchanged through an integration API; (viii) continuous monitoring, as described in some embodiments of the present invention, refers to the act of monitoring an integration-solution while it is running (i.e. delivered in production); (ix) such monitoring is not occasional, but it is meant to be an integral part of the integration-solution; (x) an orchestration loop of the orchestration engine in some embodiments represents such behavior; (xi) monitoring would always be running, daemon-style; (xii) monitoring at runtime; (xiii) runtime monitoring and remediation logic delivered as part of the solution; and (xiv) providing a monitoring capability to be delivered as part of the solution.

Some embodiments of the present invention may include one, or more, of the following features, characteristics and/or advantages: (i) systematic monitoring is used in some embodiments to indicate the act of analyzing during the monitoring phase different aspects of the solution (i.e. detecting and learning about changes); (ii) information exchanged through an API is typically described by a schema, which is a list of the fields, types, and structures of the values and/or information exchanged while an API is invoked; (iii) APIs enable integration among otherwise independent software processes; (iv) in this context schema variation is when the creator and/or provider of the API modifies its schema (e.g. creating or renaming elements of it or changing their type), impacting the existing API integration; (v) circumstances that typically lead to a change in schema at runtime include an API provider adding a new field, changing the name of a field, etc.; (vi) performance drift indicates a variation or degradation of how an existing integration performs; (vii) variation and degradation typically refers to one or more of the following important metrics for service integrations which are linked with API performance monitoring (but may include others): (a) service integrations API response time, (b) service integrations API availability, (c) service integrations concurrent users, (d) how many number of request services (service integration framework) is able to serve per second without compromising performance, (e) error rate (for example, how many number of 5xx errors in a server log), and/or (f) predefined errors; (viii) parameters are typically set based on the services provided; (ix) it may be desirable to sample response time every transaction for any services that alert for outages; (x) response time for data transfers are less critical therefore may be checked only once per minute; (xi) implementing a continuous and systematic monitoring and remediation loop while the integration solution is working; and (xii) provide a self monitoring integration solution with ability to be self remediated (schema variations) and optimized (performance drifts).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Runtime: the time during which a program is running/executing in a production environment, as opposed to other program lifecycle phases such as compile time, link time and load time, or in a development environment (IDE).

What is claimed is:

1. A computer-implemented method (CIM) comprising:
receiving an integration framework including a plurality of endpoint products and an adapter module, where the plurality of endpoint products includes at least a first endpoint product, each endpoint product includes a set of application programming interfaces (APIs), and the adapter module includes machine language for facilitating compatibility between at least some of the plurality of endpoint products;
monitoring output from the plurality of endpoint products during runtime;
detecting at least one change to the at least one API of the set of APIs of the first endpoint product based, at least in part, on the monitored output;
collecting data from the plurality of endpoints and their corresponding sets of APIs based, at least in part, on the detected at least one change;
determining, by machine logic, a set of modifications to the machine language of the adapter module based, at least in part, on the collected data; and
responsive to determining the set of modifications, applying, automatically through machine logic, the set of modifications to the machine language of the adapter module based, at least in part, on the detected at least one change and the determined set of modifications.

2. The CIM of claim 1, further comprising:
training a machine learning module for determining a set of modifications to the adapter module based, at least in part, on a set of training data.

3. The CIM of claim 2, wherein the determined set of modifications is further based, at least in part, on an insights data set indicative of insights from the trained machine learning model.

4. The CIM of claim 3, further comprising:
monitoring output from at least one endpoint of the plurality of endpoints during runtime based, at least in part, on the applied set of modifications; and
responsive to monitoring output from at least one endpoint of the plurality of endpoints during runtime based, at least in part, on the applied set of modifications, updating, automatically through machine logic, the trained machine learning model based, at least in part, on the monitored output and the applied set of modifications.

5. The CIM of claim 2 wherein:
the trained machine learning module includes a plurality of specialized sub-modules, where each specialized sub-module is trained with specific data relevant to an intended specialty of the specialized sub-module;
the plurality of specialized sub-modules includes at least a monitoring sub-module; and
the monitoring sub-module monitors the output of each endpoint of the plurality of endpoints by: (i) clustering the monitored output with specific error patterns, and (ii) classifying the error patterns to specific classes of errors with specific associated remediation actions.

6. The CIM of claim 5, wherein the plurality of specialized sub-modules improves
accuracy of each sub-module at performing its respective specialty based, at least in part, on narrowly focused training data, relative to a generalized machine learning module applied to remediating specialties of each specialized sub-module of the plurality of specialized submodules.

7. The CIM of claim 1, wherein the detected at least one change includes at least one change to at least one of the following: (i) schema variation, and (ii) performance drift.

8. A computer program product (CPP) comprising:
a machine readable storage device; and
computer code stored on the machine readable storage device, with the computer code including instructions for causing a processor(s) set to perform operations including the following:
receiving an integration framework including a plurality of endpoint products and an adapter module, where the plurality of endpoint products includes at least a first endpoint product, each endpoint product includes a set of application programming interfaces (APIs), and the adapter module includes machine language for facilitating compatibility between at least some of the plurality of endpoint products,
monitoring output from the plurality of endpoint products during runtime,
detecting at least one change to the at least one API of the set of APIs of the first endpoint product based, at least in part, on the monitored output,
collecting data from the plurality of endpoints and their corresponding sets of APIs based, at least in part, on the detected at least one change,
determining, by machine logic, a set of modifications to the machine language of the adapter module based, at least in part, on the collected data; and
responsive to determining the set of modifications, applying, automatically through machine logic, the set of modifications to the machine language of the adapter module based, at least in part, on the detected at least one change and the determined set of modifications.

9. The CPP of claim 8, wherein the computer code further includes instructions for causing the processor(s) set to perform the following operations:
training a machine learning module for determining a set of modifications to the adapter module based, at least in part, on a set of training data.

10. The CPP of claim 9, wherein the determined set of modifications is further based, at least in part, on an insights data set indicative of insights from the trained machine learning model.

11. The CPP of claim 10, wherein the computer code further includes instructions for causing the processor(s) set to perform the following operations:
- monitoring output from at least one endpoint of the plurality of endpoints during runtime based, at least in part, on the applied set of modifications; and
- responsive to monitoring output from at least one endpoint of the plurality of endpoints during runtime based, at least in part, on the applied set of modifications, updating, automatically through machine logic, the trained machine learning model based, at least in part, on the monitored output and the applied set of modifications.

12. The CPP of claim 9, wherein:
- the trained machine learning module includes a plurality of specialized sub-modules, where each specialized sub-module is trained with specific data relevant to an intended specialty of the specialized sub-module;
- the plurality of specialized sub-modules includes at least a monitoring sub-module;
- the monitoring sub-module monitors the output of each endpoint of the plurality of endpoints by: (i) clustering the monitored output with specific error patterns, and (ii) classifying the error patterns to specific classes of errors with specific associated remediation actions;
- the plurality of specialized sub-modules improves accuracy of each sub-module at performing its respective specialty based, at least in part, on narrowly focused training data, relative to a generalized machine learning module applied to remediating specialties of each specialized sub-module of the plurality of specialized sub-modules; and
- the detected at least one change includes at least one change to at least one of the following: (i) schema variation, and (ii) performance drift.

13. A computer system (CS) comprising:
- a processor(s) set;
- a machine readable storage device; and
- computer code stored on the machine readable storage device, with the computer code including instructions for causing the processor(s) set to perform operations including the following:
- receiving an integration framework including a plurality of endpoint products and an adapter module, where the plurality of endpoint products includes at least a first endpoint product, each endpoint product includes a set of application programming interfaces (APIs), and the adapter module includes machine language for facilitating compatibility between at least some of the plurality of endpoint products,
- monitoring output from the plurality of endpoint products during runtime, detecting at least one change to the at least one API of the set of APIs of the first endpoint product based, at least in part, on the monitored output,
- collecting data from the plurality of endpoints and their corresponding sets of APIs based, at least in part, on the detected at least one change,
- determining, by machine logic, a set of modifications to the machine language of the adapter module based, at least in part, on the collected data and
- responsive to determining the set of modifications, applying, automatically through machine logic, the set of modifications to the machine language of the adapter module based, at least in part, on the detected at least one change and the determined set of modifications.

14. The CS of claim 13, wherein the computer code further includes instructions for causing the processor(s) set to perform the following operations:
- training a machine learning module for determining a set of modifications to the adapter module based, at least in part, on a set of training data.

15. The CS of claim 14, wherein the determined set of modifications is further based, at least in part, on an insights data set indicative of insights from the trained machine learning model.

16. The CS of claim 15, wherein the computer code further includes instructions for causing the processor(s) set to perform the following operations:
- monitoring output from at least one endpoint of the plurality of endpoints during runtime based, at least in part, on the applied set of modifications; and
- responsive to monitoring output from at least one endpoint of the plurality of endpoints during runtime based, at least in part, on the applied set of modifications, updating, automatically through machine logic, the trained machine learning model based, at least in part, on the monitored output and the applied set of modifications.

17. The CS of claim 14, wherein:
- the trained machine learning module includes a plurality of specialized sub-modules, where each specialized sub-module is trained with specific data relevant to an intended specialty of the specialized sub-module;
- the plurality of specialized sub-modules includes at least a monitoring sub-module;
- the monitoring sub-module monitors the output of each endpoint of the plurality of endpoints by: (i) clustering the monitored output with specific error patterns, and (ii) classifying the error patterns to specific classes of errors with specific associated remediation actions;
- the plurality of specialized sub-modules improves accuracy of each sub-module at performing its respective specialty based, at least in part, on narrowly focused training data, relative to a generalized sa learning module applied to remediating specialties of each specialized sub-module of the plural of specialized sub-modules; and
- the detected at least one change includes at least one change to at least one of the following: (i) schema variation, and (ii) performance drift.

* * * * *